H. WENDT.
Making Shear Blades.
No. 103,693.   Patented May 31, 1870.
Fig. 4.
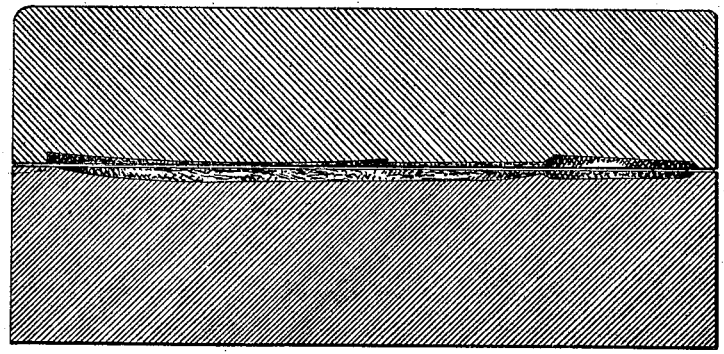
Fig. 1.
Fig. 2.
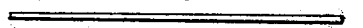
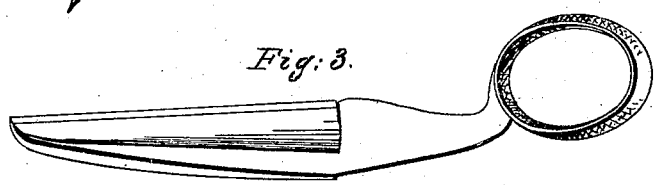
Fig. 3.

United States Patent Office.

HERMANN WENDT, OF ELIZABETH, NEW JERSEY, ASSIGNOR TO HENRY SEYMOUR & CO., OF NEW YORK CITY.

Letters Patent No. 103,693, dated May 31, 1870.

IMPROVED PROCESS OF WELDING AND TEMPERING SHEAR-BLADES.

The Schedule referred to in these Letters Patent and making part of the same.

I, HERMANN WENDT, of Elizabeth, in the county of Union and State of New Jersey, have invented a certain new and useful Process for Welding and Simultaneously Tempering the Steel Blades of Scissors, Shears, and other Cutting-Tools, of which the following is a specification.

Nature and Objects of the Invention.

The nature of my invention consists in welding or uniting the steel blades to the iron handles or main parts of cutting instruments, and at the same time tempering them, by compressing the parts while in a heated state between dies of proper form.

The means commonly employed at the present time in the manufacture of cutting instruments to unite the blades and handles, is either welding them together with a hammer, by hand, or with a "drop"— a weight arranged to drop upon the articles placed beneath it, on a suitable bed; but the great objection to this process is the liability of the parts to be broken by the percussion.

The process, also in common use, of tempering the parts to the proper degree necessary to give them a good cutting-edge, by heating and immersing in water or oil, is likewise attended with many objections. The operation is one of great care and nicety, and occupies considerable time. The blades are frequently warped and distorted by the action of the water, so that it is necessary to draw the temper and straighten them with a hammer, and afterward temper them a second time; and the resulting loss to the manufacturer, both in stock and in the expenditure of time, is considerable.

The object of my invention is to remove these difficulties attending the manufacture of cutting instruments, by enabling the operations of welding and tempering to be performed jointly, at one and the same time, thereby reducing the cost of production of the instruments.

Description of the Drawing.

Figure 1 represents a vertical longitudinal section of the dies employed in this process.

Figure 2 is a view of a scissors' blank, before it is placed in the dies.

Figure 3 is a top view of a blank after the steel blade has been welded.

Figure 4 is a blank that has been welded and hardened in a straight die, illustrating the object of making the dies, fig. 1, of a curved form.

General Description.

The dies, fig. 1, are made of a curved shape, the lower die being made concave and the upper one convex, in about the ratio of one-sixteenth of an inch to an inch in length of the blades, for the purpose of preventing the blanks from twisting or warping out of the proper shape after they have been removed from the dies and have become cold.

The tendency of the blades while cooling, after they are removed from the dies, is to bend and become set into a curved shape, as shown in fig. 4, in about the ratio of one-sixteenth of an inch to each inch of their length. In constructing the dies, therefore, I make them of a sufficient curve in the opposite direction to force the blades when cooling to become set straight enough for the subsequent operations of grinding and polishing.

In the dies as thus constructed I place the blank and steel part forming the blade, heated to a cherry-red, the surfaces to be united being coated with borax, and subject them to compression in a suitable press; and for the purpose of tempering the blade I retain it in the dies a length of time proportionate to the size of the instrument. A scissors' blank of the size shown in the drawing, for instance, should be kept in the dies for about three seconds. After the blank has been removed from the dies, the heat remaining in the iron part of it will draw the temper of the steel part which has been chilled in the dies sufficiently to give the blade, when finished, a proper cutting-edge, and to allow the steel while cooling to contract and become set with the iron into the required straight form. The heavier the parts are made the longer time should they be kept in the dies. The time for each article can be readily ascertained by experiment.

By the employment of this process the loss of parts by breakage during the operation of welding, by percussion or with a hammer, is prevented, while the trouble and the cost in time and labor incident to the old process of tempering are removed.

The cutting qualities of the instruments produced by this method are greatly superior to those of the instruments made under the old process, as the edges are tempered uniformly, under every circumstance, to the same degree, while in the old process, by hand, it is almost an impossibility to obtain two edges of the same temper.

Claim.

I claim the within-described process of welding the blades or cutting parts of scissors, shears, or other cutting tools to the handles thereof, by compression in curved dies and otherwise, as described, and simultaneously tempering them, in the manner substantially as described and specified.

HERMANN WENDT.

Witnesses:
JAS. BINGIN,
EDWARD E. OSBORN.